United States Patent [19]
Owades et al.

[11] Patent Number: 5,455,052
[45] Date of Patent: Oct. 3, 1995

[54] PROCESS FOR PRODUCING A MORE STABLE MALT BEVERAGE

[76] Inventors: Joseph L. Owades, 3097 Wood Valley Rd., Sonoma, Calif. 95476; Kimberly D. LaBrie, 3120 Franklin St., No. 2, San Francisco, Calif. 94123

[21] Appl. No.: 247,867

[22] Filed: May 23, 1994

[51] Int. Cl.$^6$ ............................... C12C 5/02; C12H 1/00
[52] U.S. Cl. ............................. 426/16; 426/29; 426/542; 426/546; 426/592
[58] Field of Search ............................. 426/16, 592, 29, 426/542, 546

[56] References Cited

U.S. PATENT DOCUMENTS 5,336,683  8/1994  Pauling et al. .................... 514/445

OTHER PUBLICATIONS

Tressel et al., Flavor of Foods and Beverages, Academic Press, New York, 1978, pp. 145–168.
Tressel et al., J. Agric. Food Chem., vol. 26, No. 6, 1978, pp. 1422–1426.
J. Pollock, Brewing Science, vol. 2, Academic Press, New York, p. 364, 1981.
G. Vernin, Chem. of Heterocyclic Comp. in Flavors & Aromas, J. Wiley & Sons, New York, pp. 86, 87, 112 & 113, 1984.
G. Hawley, The Condensed Chemical Dictionary, 10th Ed., Van Nostrand Reinhold Co., New York, pp. 864, 865, 1981.
J. S. Hough et al., Malting and Brewing Science, vol. II, 2nd Ed., Chapman and Hall, New York, p. 795, 1982.

Primary Examiner—Donald E. Czaja
Assistant Examiner—Curtis E. Sherrer
Attorney, Agent, or Firm—Hayes, Soloway, Hennessey, Grossman & Hage

[57] ABSTRACT

Onset of oxidation flavor in a malt beverage is delayed by addition of a lactone to the malt beverage during the brewing process.

11 Claims, No Drawings

PROCESS FOR PRODUCING A MORE STABLE MALT BEVERAGE

FIELD OF INVENTION

The present invention relates to the production of malt beverages, and more particularly to the production of malt beverages having improved flavor-stability. The invention has particular utility in the production of fermented malt beverages such as beer and will be described in connection with such utility, although the invention also may be advantageously used in the production of other malt flavored beverages.

BACKGROUND OF THE INVENTION

In the production of beer, a warm water extract of barley malt, with or without other unmalted grains such as rice or corn, is boiled with hops, cooled, and then subjected to the fermentative action of yeast. The warm water used to extract the malt allows the action of several enzymes in the malt to hydrolyze the starch in the barley (and in the corn or rice) to fermentable sugar.

As a result of material contained in the ingredients, or the mashing process, or the fermentation process, or a combination of two or more of the above, malt beverages are subject to an oxidative change in flavor. The resulting flavor is variously described as papery, cardboard-like, stale, or just plain "oxidized". This flavor change typically takes place within 2–3 months of room temperature storage, and is gradual and continuing. Most American manufacturers of beer recall beer from the market if it is more than about 4 months from the packaging date. Although the oxygen in a bottle or can of beer is typically consumed by the beer within less than 24 hours after packaging, the noticeable presence of oxidized flavor generally does not appear until many weeks later.

The flavor of oxidized malt beverages generally is attributed to unsaturated aldehydes notably trans-2-nonenal, and related compounds. These compounds are thought to be derived from unsaturated fatty acids, which split and then lose two hydrogen atoms. This loss of hydrogen is a form of oxidation.

The present practice of delaying the staling of beer is to maintain a low level of air (or oxygen) in the packaged beer, storing the beer at cold temperatures, and/or by the addition of sulfites.

Modern beer-filling machines are designed to achieve very low air levels in the packaged product. Typically, the present practice is to evacuate the bottle before it is filled with beer, or to replace the air in the evacuated bottle with carbon dioxide before filling, and to cause overfoaming in the bottle to displace the head space gases with beer foam. All of these practices can produce air levels of less than 0.5 ml. per 12 oz. bottle. But even these low levels of air still allow beer to oxidize in 2–3 months.

Another technique for stabilizing beer against oxidation is to add sulfur dioxide, in the form of bisulfite, to the beer. However, in the United States, addition of sulfur dioxide is limited by law to less than 10 ppm, and even those low levels product undesirable and sulfury aromas in some beers. Also the bisulfite, which works by binding to aldehydes, has many other aldehydes in beer to bind to (notably acetaldehyde, a normal by-product of fermentation), and so its action is often muted. Other countries such as Germany prohibit any addition of sulfur dioxide.

OBJECT OF THE INVENTION

It is thus a primary object of the present invention to provide a process for enhancing the flavor stability of a malt beverage. A more specific object of the present invention is to provide a malt beverage in which oxidative flavor does not begin to appear for many months of storage.

Still other objects and advantages of the present invention will be apparent from the following detailed description of the invention.

The invention accordingly comprises the processes involving the several steps and relation of one or more steps with respect to each other, and the materials and products possessing the features, properties and relations of elements, all of which are exemplified in the following detailed description, and the scope of the application, which will be indicated in the claims.

BRIEF DESCRIPTION OF THE INVENTION

I have found that the addition of lactones to malt beverages delays the onset of oxidation flavor.

Lactones occur naturally as odor-bearing components of various plant products. Lactones also may be made synthetically. In accordance with my invention, I have found that both "naturally occurring lactones" and "synthetic lactones" may be advantageously be employed to delay onset of development of oxidation flavor in a malt beverage.

The lactone may be added at any stage in the brewing process, but preferably is added after fermentation and filtration, or during storage or aging. The lactone may be added as a pure lactone, or as a natural or artificial component of a flavoring such as pineapple or coconut flavoring. When added as a pure lactone, the lactone should be diluted, for example, with alcohol (ethanol) or propylene glycol before addition to the beverage. If desired, the beverage also may be treated with one or a mixture of absorptive agents such as activated charcoal, silica gel, or polyvinyl polypyrrolidine, or a chill-proofing agent such as papain or tannic acid.

The flavor stabilizing improvement appears to be dependent upon the quantity of lactone added. Generally, the lactone(s) may be added in amounts ranging from about 0.01 to about 50 parts per million, by weight, of the malt beverage. Addition of less than about 0.01 parts per million of lactone(s) to malt beverage appears to result in little improvement in flavor stability, while addition of more than about 50 parts per million appears to result in little additional improvement in flavor stability. The reason why the addition of a lactone to a malt beverage improves flavor stability is not known. However, while not wishing to be bound by theory, it is believed that the lactone may sterically hinder oxidation of precursors of the unsaturated aldehydes, or absorb the unsaturated aldehydes. It is also possible, but believed unlikely that the lactones may provide for sacrificial oxidation or acid formation as is the case with bisulfites.

The resulting malt beverage has superior flavor stability over similar malt beverages made without the addition of a lactone, and none of the disadvantages of undesirable and sulfury aromas common to prior art techniques for stabilizing beer against oxidation by the addition of a bisulfite.

The present invention will be further described in the following working examples.

Example I

Two thousand lbs. of corn grits were added to 25 bbls. of water, and the stirred mixture was heated to 60° C., rested for 10 minutes and then heated to boiling and boiled for 30 minutes.

At the same time, 2,000 lbs. of ground barley malt were added to 30 bbls. of water at 45° C. in a mash tub. The mixture was allowed to remain at this temperature for 20 minutes and then the contents of the boiling cooker were added to the mash tub. The combined mash was held at 68° C. for 30 minutes and then heated to 75° C. and transferred to a lauter tub.

The clear wort drained from the mash, with spargings, were run into a kettle and boiled with hops and about 0.7% of its weight with activated carbon for 1 hour.

The liquid is strained, cooled, treated with yeast and allowed to ferment.

After fermentation it is transferred to an aging tank and treated with 0.11 g. of gamma undecalactone (dissolved in propylene glycol) per bbl. of beer.

After 14 days the beer is filtered twice and packaged. The beer was subjected to accelerated aging by heating at 38° C. for 30 days and 60 days, and compared to untreated controls undergoing the same brewery treatment but without the addition of the gamma undecalactone.

Seven panel members rated the beers for stale flavor, on a scale of 0 to 5, with 0 being devoid of oxidized flavor and 5 being very oxidized.

The gamma undecalactone-containing beer was rated 0.5 and 0.8, while the untreated controls averaged 3.1 and 4.0 after 30 days and 60 days aging, respectively.

Example II 4,000 lbs. of ground barley malt are mixed with 40 bbls. of water at 48° C., and allowed to rest for 25 minutes. The temperature is raised to 65° C. and held there for 30 minutes. Then the temperature is raised to 75° C. and the mash transferred to a mash filter.

The filtrate and sparging are run into a kettle and 5,500 lbs. of corn syrup are added. The kettle is boiled with 20 lbs. of hops and then strained and cooled.

Yeast is added and the wort allowed to ferment. The fermented beer is transferred to a storage tank to which had been added 0.21 g. of gamma-nonalactone per bbl. of beer.

After 20 days the beer is filtered twice and packaged.

A control, split from the original brew, but without the gamma-nonalactone, was also aged and packaged.

Both control and treated beers were subjected to accelerated aging at 38° C. for 30 and 60 days, and then tasted. The panel of 6 members rated the beers for stale flavor, a scale of 0 to 5, with 5 being very oxidized.

The gamma-nonalactone treated beer was rated 0.8 and 1.0 after aging, respectively, while 30 and 60 days, the untreated control was rated 3.0 and 3.7 for the same respective time periods.

Example III

The procedure of Example II was repeated except 33 grams of natural coconut flavor, containing 2 weight percent of gamma-nonalactone, was added per bbl. of beer. The resulting beer was filtered, packaged and subjected to accelerated aging as in Example II, and subjected to a taste panel as in Example II. Similar results were obtained.

Example IV

The procedure of Example II was except 2 grams of artificial coconut flavor (available from Givaudan-Roure, Clifton, N.J.), and containing 5 weight percent of gamma-nonalactone was added per bbl. of beer. The resulting beer was aged for 20 days, filtered and packaged as before, and then subjected to accelerated aging, and taste tested as before. Results similar to Example II were obtained.

As can be seen from the foregoing, the addition of a lactone to a malt beverage inhibits oxidation, and thus enhances flavor-stability.

Certain changes may be made without departing from the scope of the invention herein involved. It is therefore intended that all matter contained in the above description shall be interpreted as illustrative and not in a limiting sense.

We claim:

1. A method of improving the stability of a malt beverage to oxidation, which comprises adding to the malt beverage about 0.01 to about 50 parts per million, by weight, of a lactone selected from the group consisting of gamma-nonalactone, gamma-undecalactone, and mixtures thereof.

2. A method according to claim 1 and including the step of diluting said lactone in alcohol prior to adding it to the beverage.

3. A method according to claim 1 and including the step of diluting said lactone in propylene glycol prior to adding it to the beverage.

4. A method according to claim 1 wherein said lactone added comprises a lactone-containing artificial flavoring.

5. A method according to claim 4 wherein said artificial flavoring comprises a pineapple flavor.

6. A method according to claim 4 wherein said artificial flavoring comprises a conconut flavor.

7. A method according to claim 1 wherein said lactone added comprises a lactone-containing natural flavoring.

8. In a method of producing a malt beverage wherein a malt mash and cereal adjuncts are combined in a kettle and boiled for a period of time, and the resulting liquid pitched with brewer's yeast and allowed to ferment for a period of time to produce the fermented liquid, the improvement which comprises adding to the fermented liquid about 0.01 to about 50 parts per million, by weight, of a lactone selected from the group consisting of gamma-nonalactone, gamma-undecalactone, and mixtures thereof.

9. In a method according to claim 8, the improvement wherein said malt beverage is filtered prior to addition of said lactone.

10. In a method according to claim 8, and including the step of diluting said lactone in alcohol prior to addition to the malt beverage.

11. In a method according to claim 8, and including the step of diluting said lactone in propylene glycol prior to addition to the malt beverage.

* * * * *

UNITED STATES PATENT AND TRADEMARK OFFICE
CERTIFICATE OF CORRECTION

PATENT NO. : 5,455,052
DATED      : October 3, 1995
INVENTOR(S): Owades et al

It is certified that error appears in the above-indentified patent and that said Letters Patent is hereby corrected as shown below:

Claim 6, Col. 4, line 37, "conconut" should be --coconut--

Signed and Sealed this

Fourteenth Day of May, 1996

Attest:

BRUCE LEHMAN

*Attesting Officer*     *Commissioner of Patents and Trademarks*